(No Model.) 3 Sheets—Sheet 1.

H. F. KLEINSCHMIDT.
ELECTRIC SWITCH.

No. 595,777. Patented Dec. 21, 1897.

Witnesses:
B. S. Ober.
Geo. M. Cofenhaver

Inventor:
Hans Friedrich Kleinschmidt.
By (No Model.) 3 Sheets—Sheet 2.

H. F. KLEINSCHMIDT.
ELECTRIC SWITCH.

No. 595,777. Patented Dec. 21, 1897.

(No Model.) 3 Sheets—Sheet 3.
H. F. KLEINSCHMIDT.
ELECTRIC SWITCH.
No. 595,777. Patented Dec. 21, 1897.
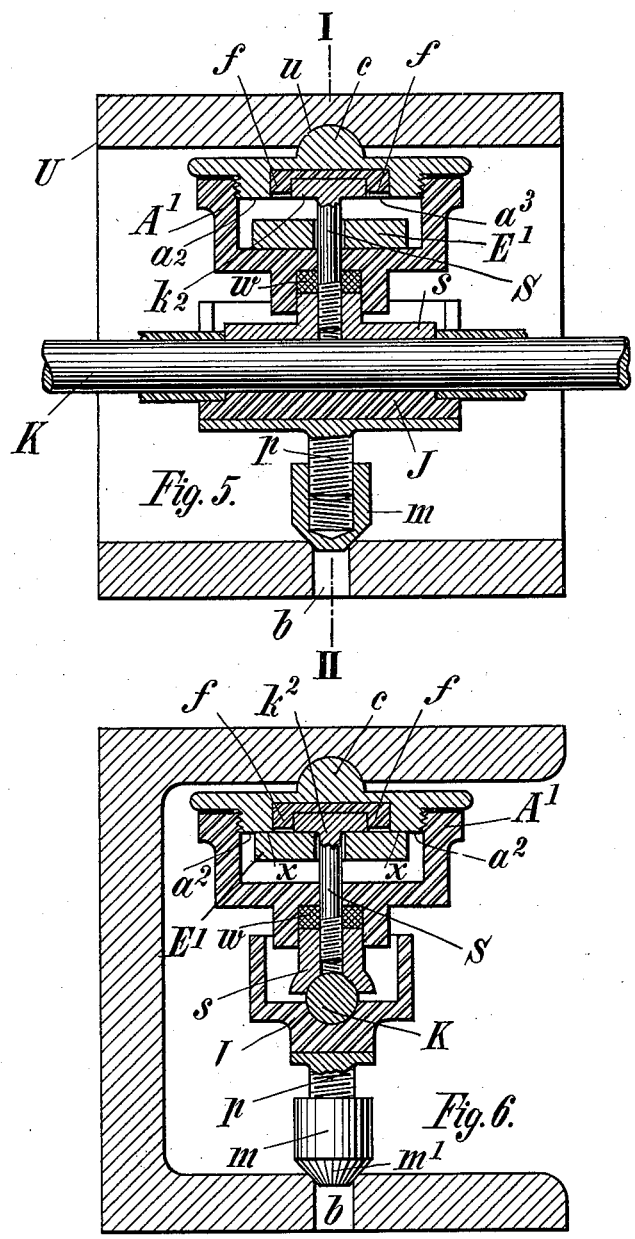

# UNITED STATES PATENT OFFICE.

HANS FRIEDRICH KLEINSCHMIDT, OF HAMBURG, GERMANY.

ELECTRIC SWITCH.

SPECIFICATION forming part of Letters Patent No. 595,777, dated December 21, 1897.

Application filed November 16, 1896. Serial No. 612,358. (No model.)

*To all whom it may concern:*

Be it known that I, HANS FRIEDRICH KLEINSCHMIDT, a subject of the German Emperor, and a resident of Hamburg, in the German Empire, have invented certain new and useful Improvements in Electric Switches, of which the following is a specification.

My invention relates to an easily transportable and exchangeable electric switch device for opening and closing the circuit of high-tension electric currents by means of magnetic force in such a manner that no sparking occurs at the contact-pieces of the said switch; and with this end in view my invention consists in certain novel features of construction and combinations of parts, as will be hereinafter fully described, and pointed out in the claims, reference being had to the accompanying drawings, forming a part of this specification, in which—

Figures 1, 2:
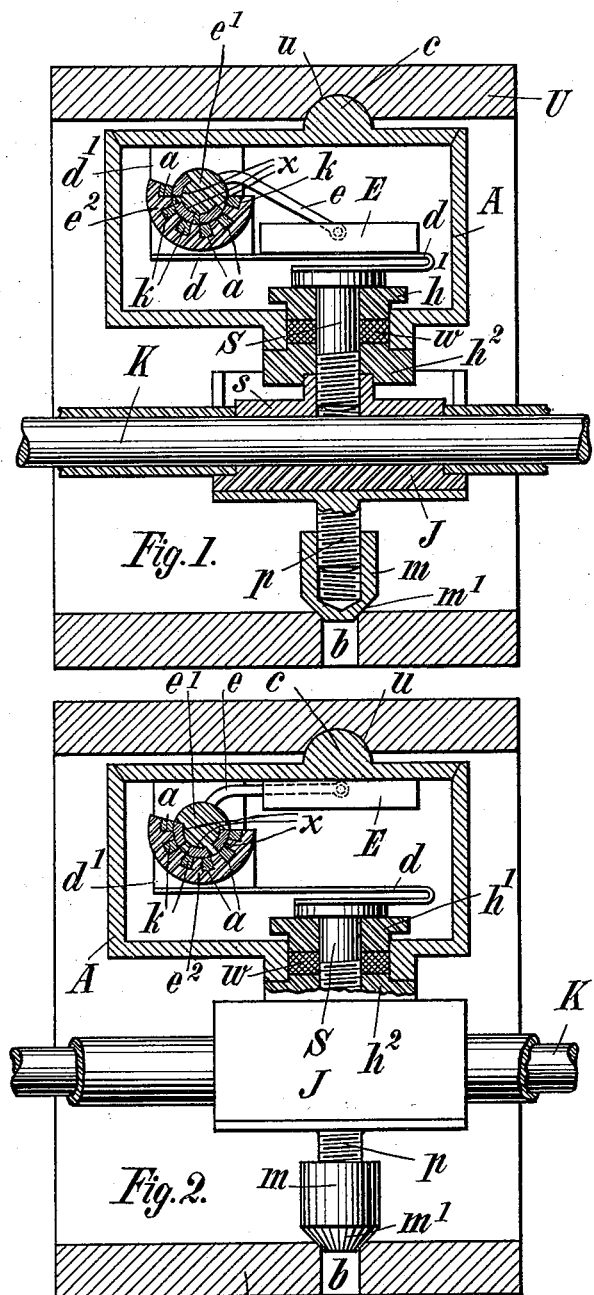
Figure 3:
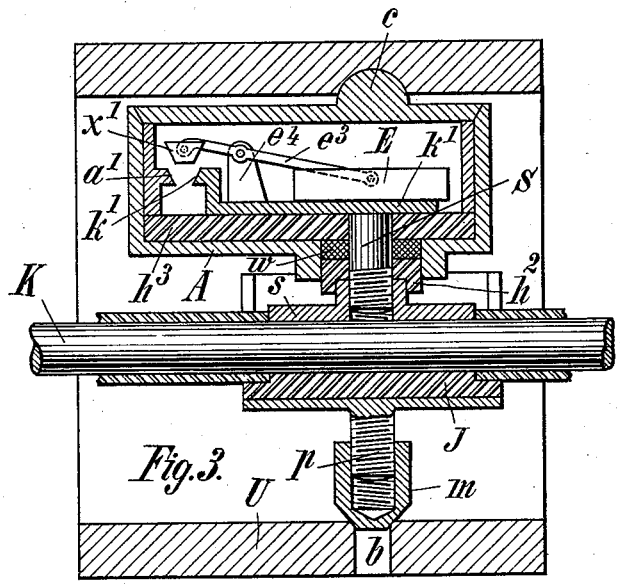
Figure 4:
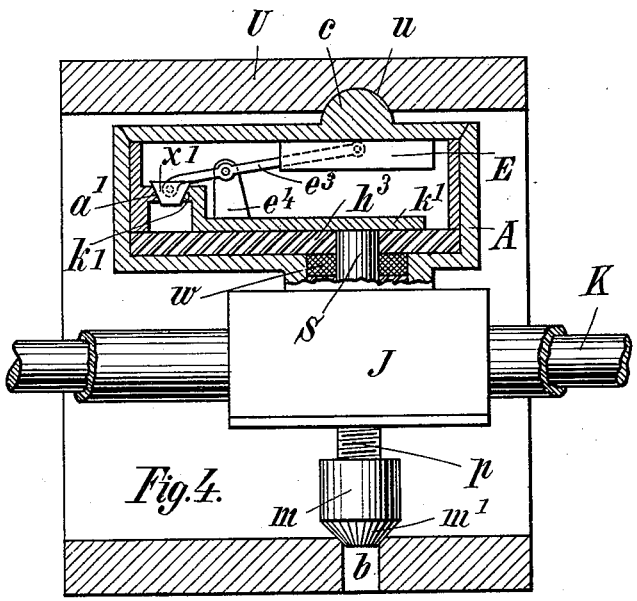

Figures 1 and 2 are longitudinal vertical sections of my improved switch, showing the same in the opened and closed position, respectively. Figs. 3 and 4 correspond to Figs. 1 and 2 and illustrate a modification. Fig. 5 is a similar view like Fig. 1, representing a further modification of my improved switch. Fig. 6 is a transverse vertical section of Fig. 5 on the line I II.

Similar letters refer to similar parts throughout the several views.

A principal part of the improved switching device or apparatus is a hermetically-closed box or case A, made of non-magnetic material and having a prismatic form, as shown in Figs. 1 to 4. The top surface of the box A is provided with a hemispherical projection $c$, while vertically below the latter a tubular opening is arranged in the bottom of the box or case A, which opening, together with two ebonite rings or collars $h'\,h^2$ and a soft india-rubber ring $w$, form a stuffing-box, through which passes hermetically a completely-insulated screw-threaded spindle S. The whole of the lower half of the box A is in some instances lined with ebonite or a similar insulating substance $h^3$, Figs. 3 and 4. Then the loosely-mounted ebonite ring $h'$, forming the stuffing-box in Figs. 1 and 2, is omitted.

At the lower extremity of the screwed spindle S an insulating-cover $s$ is arranged to partly embrace the main conductor K, against the bottom surface of which a second insulating-cover J is pressed by means of a screw-bolt $p$ and a roughened conical nut $m$. This latter cover is widened at its upper part, so as to form a kind of box. (See Fig. 6.) The current passes through a U-shaped or double-angled rail U, Figs. 1 and 6, which has a hole $b$ in its lower side adapted to receive the roughened conical nut $m$ and a recess $u$ in its upper side fitted to receive the hemispherical projection $c$ at the top of the box A, which is thus provided with a ball-and-socket joint.

The whole apparatus is placed in the channel-rail U, so that the half-ball $c$ of the ball-and-socket joint is placed in the recess $u$ in the channel-rail, the main conductor is placed between the covers $s$ and J, and the roughened conical nut, carrying the supporting screw-bolt $p$, inserted into the hole $b$ in the lower side of the U-shaped rail and turned until the apparatus is held fast. The teeth or rough projections of the conical part $m'$ of the nut prevent it from becoming loose. The upper cover $s$ has a sufficiently large contact-surface and at the same time, owing to the use of spherical surfaces between the channel-rail U and the box A, constant and perfect contact is obtained even should the box have been inserted obliquely.

The working parts proper are located in the box A. To one extremity of a pivotally-arranged lever-arm $e$ a piece of iron E is fixed, which, when attracted by a magnet applied at the outside of the apparatus, will close the circuit, as described later on, while, when the magnetic action upon the piece of iron or armature E ceases, the said armature will be caused to fall back by the action of gravity, so that the circuit is reopened.

The electrical connections between the contact bolt or shaft S and the channeled working conductor U are arranged as follows, with a view to reducing the contacts to a minimum: Within the box A is arranged a half-bearing $e'$ of insulating material, in which are embedded three pairs of contact-strips $a$ and $k$, flush with the inner periphery of said half-bearing. The contact-strips $k$ are electrically connected in any well-known or usual manner with the main conductor K through a bent or U-shaped leaf-spring $d$, the short arm of which bears on the head of the contact bolt or shaft S, while the contact-strips $a$ are adapted to be electrically connected with said contact-strips $k$ and with the cover of the box A through the medium of a shaft $e'$ of insulating material, provided with contact-strips $x$, adapted to bridge two of the contact-strips $a$ $k$ in its bearing, and through the medium of a conductive lever $e$, electrically connected with said contact-strips $x$ and having a soft-iron armature pivotally connected to its free end. To this end the contacts $a$ $k$ are so arranged relatively to the contacts $x$ that when the armature is in its normal position on the spring $d$, which acts as a support therefor, the contacts $x$ will not bridge any one pair of the contacts $a$ $k$, but will, on the contrary, bridge contacts of like name, so that the circuit through the switch is interrupted, as shown in Fig. 1. As soon, however, as magnetic influence is exerted upon the working conductor U either by a magnet applied thereto or traveling along the same a magnetic current is set up and the armature E will be attracted and brought into contact with the cover of the switch-box, thereby imparting a partial rotation to the shaft $e'$, so that the contacts $x$ will bridge pairs of contacts $a$ $k$ and close the feeder-circuit to the working conductor through the lever $e$, armature E, and the hemispherical bearing of the switch-box A, so that current may be taken from the working conductor for any desired purpose. Of course it will be understood that the switch, as well as the conductor-spring $d$, are insulated from the box A, which, as stated, is constructed of a non-magnetic material that is a good conductor of electricity.

By the arrangement described the contacts are reduced to a minimum, are not liable to become inoperative, as is the case when spring-contacts are used, while the contact-surfaces are kept clean and bright by the rocking movements of the shaft $e'$.

According to the constructional example shown in Figs. 3 and 4 two ledges $a'$ and $k'$ are electrically connected in an analogous manner by a wedge-plug $x'$, attached to the double-armed armature-lever $e^3$, pivoted in a suitable support $e^4$. The upper ring of the stuffing-box is in this instance, as already stated above, replaced by an insulating-plate $h$, which covers the whole bottom of the box A and upon which the working parts are mounted before the plate $h^3$ is inserted into the said box.

According to still another constructional example shown by Figs. 5 and 6, there is provided a circular box A', consisting of ebonite and being hermetically closed by a cover $a^2$ of non-magnetic metal. This cover forms a substitute for the contact-pieces $a$ or $a'$, respectively, of the switch, Figs. 1 and 3, and has a central recess $a^3$, into which an ebonite disk $f$ is firmly inserted. This insulating-disk $f$ has also a central recess, into which the disk-shaped head $k^2$ of the stuffing-box shaft S is firmly inserted, so as to form a substitute for the other contact-piece $k$ of Fig. 1 or $k'$ of Fig. 3. The armature E' in this instance is not carried by a lever, but is movable vertically along the shaft S, being bored centrally for this purpose. This armature is ground together with the contact-pieces $a^2$ $k^2$, so that when attracted the armature E' will make complete contact with both the said annular contact-pieces at all points and thus serve to directly replace the bridge $x$ or $x'$ used in the foregoing examples.

In order to prevent sparking, which would have an injurious effect upon the working parts, a vacuum is produced in the working-box chamber A or A', respectively, by means of a small pipe suitably arranged on the said chamber, the said pipe being subsequently closed, or the chamber is completely filled with oil or other suitable insulating liquid.

Where the apparatus is fitted up and used in damp places, the lower insulating-cover J is filled up to its top with any suitable insulating substance in order that the exposed portions of the main conductor, as well as the upper cover $s$, may be efficiently protected from external influences.

Having fully described my invention, what I desire to claim and secure by Letters Patent is—

1. In combination, a channeled rail-conductor, a main conductor or feeder extending along the channel of said rail-conductor and a switch-box supported by the feeder, said parts braced against the upper and lower flanges of the rail-conductor, for the purpose set forth.

2. In combination, a channeled rail-conductor, a switch-box in the channel thereof, a main conductor or feeder below the box and a clamping device for clamping the feeder to the box and the latter to the upper flange of the rail-conductor, for the purpose set forth.

3. In combination a channeled rail-conductor, a switch-box whose cover is provided with a projection fitting a recess in the under side of the upper rail-flange, a main conductor or feeder, and a clamping device interposed between it and the lower rail-flange to clamp the feeder to the box and the latter to the upper rail-flange, for the purpose set forth.

4. In combination, a channeled rail-conductor, a switch-box in the channel thereof, a main conductor or feeder below and supporting said switch-box, and a ball-and-socket connection between the switch-box and upper rail-flange and between the feeder and lower rail-flange, for the purpose set forth.

5. In combination, a channeled rail-conductor, a switch-box in the channel thereof, a main conductor or feeder, an insulation-bearing therefor from which the said box is supported, a ball-and-socket connection between the switch-box and upper flange of the rail-conductor, and a like connection between the feeder-bearing and lower rail-conductor flange, an electric circuit including the feeder, the cover of the switch-box and the rail-conductor, and a magnetic switch in said box adapted to be operated by magnetic energy acting on the upper rail-conductor flange, said switch interposed in said electric circuit for the purpose set forth.

6. In combination a channeled rail-conductor provided in the under side of its upper flange with a hemispherical socket, a switch-box whose cover is provided with a boss or projection fitting said recess, a main conductor or feeder supporting said box, a support for said feeder having a screw-threaded shank, and a conical nut thereon fitting a seat in the lower flange of the rail-conductor, for the purpose set forth.

7. In combination, a channeled rail-conductor provided in the under side of its upper flange with a hemispherical socket, a switch-box whose cover is provided with a boss or projection fitting said recess, a main conductor or feeder supporting said box, a support for said feeder having a screw-threaded shank, a conical nut thereon fitting a seat in the lower flange of the rail-conductor, and means for locking said nut against accidental rotation, for the purposes set forth.

8. In combination, a channeled rail-conductor, a switch-box of insulating material and a non-magnetic but electrically conductive cover for said box, a main conductor or feeder, a non-conductive bearing therefor provided with an extension fitting a seat in the bottom of said box, a clamping device acting upon the lower flange of the rail-conductor to clamp the feeder to the box and the latter to the upper rail-flange, a stud or bolt electrically connected with the feeder and a non-magnetic but electrically conductive armature having motion on said bolt and adapted to make contact with the cover of the switch-box when attracted by a magnetic current set up in the upper rail-flange and the box-cover to close the electric circuit from the feeder to the rail-conductor, substantially as and for the purpose set forth.

9. The combination with the channeled rail-conductor U provided with the seat $u$, the box A of insulated material, its cover of non-magnetic but electrically conductive material, the conductive stud or shaft S, connected with but insulated from said box-cover, and the armature E', having motion on said stud and adapted to form an electrical connection between the box-cover and shaft S, of the main conductor K seated in two half-bearings of insulated material, the upper half-bearing provided with a tubular projection fitting a seat in the bottom of the switch-box, into which tubular projection the aforesaid shaft S extends, and a clamping device consisting of a headed screw-bolt and a nut thereon having its lower end coned, said bolt interposed between the lower half-bearing for the main conductor and the lower flange of the rail-conductor, said conical end of the nut seating in a recess in said lower flange, substantially as and for the purpose set forth.

In testimony that I claim the foregoing as my invention I have signed my name, in presence of two witnesses, this 3d day of November, 1896.

HANS FRIEDRICH KLEINSCHMIDT.

Witnesses:
MAX LEMCKE,
HERMANN NAGEL.